(12) United States Patent
Kaiser et al.

(10) Patent No.: US 8,826,548 B2
(45) Date of Patent: Sep. 9, 2014

(54) HAND-HELD JIGSAW

(75) Inventors: Hans Kaiser, Leuzigen (CH); Klaus Marx, Stuttgart (DE); Stefano Delfini, Bettlach (DE); Wolfgang Niehsen, Bad Salzdetfurth (DE); Thilo Koeder, Gerlingen (DE); Gunter Flinspach, Leonberg (DE); Joachim Frangen, Heilbronn (DE); Joachim Platzer, Remseck-Hochberg (DE)

(73) Assignee: Robert Bosch GmbH, Stuttgart (DE)

( * ) Notice: Subject to any disclaimer, the term of this patent is extended or adjusted under 35 U.S.C. 154(b) by 490 days.

(21) Appl. No.: 12/281,442

(22) PCT Filed: Sep. 20, 2007

(86) PCT No.: PCT/EP2007/059965
§ 371 (c)(1),
(2), (4) Date: Sep. 2, 2008

(87) PCT Pub. No.: WO2008/055738
PCT Pub. Date: May 15, 2008

(65) Prior Publication Data
US 2009/0025233 A1 Jan. 29, 2009

(30) Foreign Application Priority Data
Nov. 9, 2006 (DE) .......................... 10 2006 052 808

(51) Int. Cl.
B23D 49/00 (2006.01)
B26D 5/00 (2006.01)
B26D 7/00 (2006.01)
B27C 1/00 (2006.01)
G01M 1/38 (2006.01)
B23D 59/00 (2006.01)
B23D 51/02 (2006.01)
B23D 49/16 (2006.01)

(52) U.S. Cl.
CPC ............ *B23D 49/167* (2013.01); *B23D 59/002* (2013.01); *B23D 51/02* (2013.01)
USPC ................ 30/392; 700/279; 83/364; 83/520; 144/154.5

(58) Field of Classification Search
CPC .. B23D 59/002; B23D 49/105; B23D 49/167; B25H 1/0092; B26D 5/007; G05D 1/0246; G06K 9/4609
USPC ............ 30/392, 393, 394; 700/279; 144/48.5, 144/154.5; 83/74, 75, 75.5, 76.6, 76.7, 83/76.8, 364, 365, 368, 371, 520; 382/141, 152
See application file for complete search history.

(56) References Cited

U.S. PATENT DOCUMENTS 3,456,698 A 7/1969 Csaki
3,504,716 A * 4/1970 Morganson et al. ............ 30/123
(Continued)

FOREIGN PATENT DOCUMENTS

CN 2717591 8/2005
CN 2762927 3/2006
(Continued)

*Primary Examiner* — Kenneth E. Peterson
*Assistant Examiner* — Samuel A Davies
(74) *Attorney, Agent, or Firm* — Michael J. Striker

(57) ABSTRACT

A hand-held jigsaw includes a saw blade and control element for automating a tracking the saw blade, the hand-held jigsaw, or both along layout lines. A sensor, preferably a camera unit, detects a layout line provided on a work piece.

10 Claims, 4 Drawing Sheets

(56) References Cited

U.S. PATENT DOCUMENTS

| | | | |
|---|---|---|---|
| 3,610,081 A * | 10/1971 | Gerber | 83/62 |
| 4,380,944 A * | 4/1983 | Gerber et al. | 83/49 |
| 4,630,109 A * | 12/1986 | Barton | 348/119 |
| 5,010,652 A * | 4/1991 | Miletich | 30/393 |
| 5,928,137 A * | 7/1999 | Green | 600/160 |
| 6,142,047 A * | 11/2000 | Galan et al. | 83/74 |
| 6,424,272 B1 * | 7/2002 | Gutta et al. | 340/937 |
| 6,462,811 B1 * | 10/2002 | Turner et al. | 356/237.1 |
| 6,614,601 B2 * | 9/2003 | Dallakian | 359/804 |
| 6,640,682 B2 * | 11/2003 | Wagner et al. | 83/289 |
| 6,722,250 B2 * | 4/2004 | Wagner et al. | 83/880 |
| 6,825,445 B2 * | 11/2004 | Shalev et al. | 219/223 |
| 7,170,076 B2 * | 1/2007 | Butler et al. | 250/559.29 |
| 7,492,351 B2 * | 2/2009 | VanWiggeren et al. | 345/157 |
| 2002/0054250 A1 * | 5/2002 | Heden et al. | 349/65 |
| 2003/0000355 A1 * | 1/2003 | Butler et al. | 83/13 |
| 2003/0005588 A1 * | 1/2003 | Gass et al. | 30/382 |
| 2005/0060896 A1 | 3/2005 | Park | |
| 2005/0248593 A1 * | 11/2005 | Feng et al. | 345/690 |
| 2005/0257985 A1 | 11/2005 | Fukushima et al. | |
| 2006/0179668 A1 | 8/2006 | Wu | |
| 2008/0052921 A1 | 3/2008 | Delfini | |
| 2008/0229589 A1 * | 9/2008 | Bone | 30/392 |
| 2008/0302226 A1 * | 12/2008 | Fischer | 83/520 |

FOREIGN PATENT DOCUMENTS

| | | | | |
|---|---|---|---|---|
| DE | 39 42 901 | | 6/1991 | |
| DE | 202004005478 | * | 7/2004 | |
| DE | 20 2004 005 478 | | 8/2004 | |
| DE | 20 2004 005478 | * | 8/2004 | B23D 49/08 |
| EP | 0 588 057 | | 3/1994 | |
| RU | 2 230 354 | | 6/2004 | |
| SU | 108 3117 | | 3/1984 | |
| SU | 1 483 255 | | 5/1989 | |
| WO | 2006/032551 | | 3/2006 | |

* cited by examiner

HAND-HELD JIGSAW

CROSS-REFERENCE TO A RELATED APPLICATION

The invention described and claimed hereinbelow is also described in German Patent Application DE 10 2006 052 608.5 filed on Nov. 9, 2006. These German Patent Applications, whose subject matter is incorporated here by reference, provides the basis for a claim of priority of invention under 35 U.S.C. 119(a)-(d).

BACKGROUND OF THE INVENTION

The present invention relates to a hand-held jigsaw.

For example, the publications US 2005/0060896 A1 and US 2005/0257985 A1 have disclosed jigsaws that are referred to as "scrolling jigsaws" and in which the saw blade is situated so that in addition to executing the stroke motion, it can be rotated manually independently of the sawing motion. This additional function facilitates the sawing of sinuous cuts.

Without additional guidance-assisting elements, sawing precisely along a predetermined contour with a jigsaw requires a large amount of practice. This task is additionally complicated by the exertion of transverse forces that cause the saw blade to go astray. Providing laterally supporting assistance systems or various navigation aids (e.g. lasers) reduces these problems, but does not eliminated them.

SUMMARY OF THE INVENTION

The invention is based on a hand-held jigsaw, in particular a scrolling jigsaw.

According to the invention, control means are provided that make it possible to automate a tracking of a saw blade and/or of the hand-held jigsaw along layout lines. In this context, a "control means" is understood in particular to be a means that permits a required orientation of the saw blade and/or the hand-held jigsaw and/or a component of the hand-held jigsaw such as a glide element to be detected and/or adapted to the orientation. This control means can be a detection unit such as a sensor system embodied in the form of a sensor and/or an actuator system embodied in the form of an actuating unit such as a servo motor and/or a step motor and/or a piezoelectric actuator. Alternatively, it would also be conceivable to use a DC motor. The term "tracking" here defines an orientation along a predetermined path that is preferably indicated by means of a marking. This marking can be a layout line such as a previously drawn pencil line and/or another marking deemed suitable by a person skilled in the art, such as an indentation and/or some other form of profiling.

The system is used to assist an operator and therefore to facilitate the sawing procedure. Taking advantage of the existing degree of freedom of the saw blade in the form of the already implemented rotation axis, the hand-held jigsaw is equipped with a special sensor system for detecting a previously drawn line or layout line and a corresponding actuator system for automatically adjusting the saw blade angle from an angle range of a pivot angle. The rotation axis here is defined by a normal that extends through a center point of a plane defined by a thickness and a width of the saw blade. Alternatively, the rotation axis of the saw blade can also be situated other than at its center point. In this case, the pivot angle represents the angle by which the saw blade can be maximally adjusted around its longitudinal axis in relation to a longitudinal axis of the glide element and/or another guidance component deemed suitable by a person skilled in the art, e.g. a chassis. This pivot angle is preferably an angle of between 0° and 90°. By contrast, the saw blade angle of the saw blade is the angle that is actually set between the lateral span of the saw blade and the longitudinal axis of the glide element or a guidance component. By means of a saw blade motion that is overlaid with a hand-guided movement of the operator, it is possible to more precisely track a previously drawn contour. Straight cuts can also be implemented without additional guides.

This produces a significantly improved work result while simultaneously simplifying operation.

It is also advantageous if it is possible to switch off means that are provided for automating a tracking of the saw blade and/or the hand-held jigsaw along layout lines. This makes it possible to create a hand-held jigsaw that can be used in a particularly flexible fashion.

If a hand-held jigsaw has a pivotable saw blade that can be driven by the control means, then a tracking of the previously drawn line by the saw blade can occur in an advantageous, structurally simple fashion. The term "pivotable" here is particularly understood to mean a turning and/or rotation of the saw blade in an axis that preferably extends parallel to a longitudinal span of the saw blade. In this connection, the turning can be achieved by clamping the saw blade into a tool socket and/or through some other exertion of force on the saw blade.

The invention is also based on a hand-held jigsaw, in particular a scrolling jigsaw.

According to the invention, a sensor is provided for detecting a layout line provided on a workpiece. The term "sensor" is understood in particular here to mean a camera unit and/or a contrast sensor unit and/or an eddy current sensor unit. This makes it possible to achieve a detection of a desired cutting direction in a particularly advantageous, inexpensive, structurally simple fashion.

The invention is also based on a hand-held jigsaw, in particular a scrolling jigsaw.

Also according to the invention, optical mouse sensors are provided for determining a speed and/or a movement direction. The term "optical mouse sensor" is understood here to mean a sensor that uses optical means such as a light-emitting diode or laser diode to illuminate a supporting surface, evaluates a light reflected against the supporting surface, calculates a speed based on the change of a physical surface of the supporting surface, and from this, calculates the movement data in the x and/or y direction. Alternatively, the movement direction and/or the advancing speed can also be determined by means of a running wheel with an angular displacement transducer, e.g. a rolling element with corresponding photoelectric beam, detectors that detect a movement in at least two directions such as an x direction and a y direction. In addition, means that are used to compare individual camera images can also be provided to determine the advancing speed. The use of optical mouse sensors makes it possible for a rugged sensor system for determining the speed and/or a movement direction to be produced in a particularly simple and inexpensive fashion.

The invention is also based on a hand-held jigsaw, in particular a scrolling jigsaw.

It is also advantageous if an actuator with a regulator is provided. An "actuator with a regulator" is understood here to be a unit that processes data from a detection unit, particularly in a control loop, and/or reacts to and/or transmits generated control signals. This unit is preferably embodied in the form of a servo motor and/or a step motor and/or a piezoelectric actuator and/or a DC motor with a regulator unit. It is thus possible for a control loop for precisely tracking a predetermined cutting line to be implemented in a structurally simple and inexpensive fashion.

The invention is also based on a hand-held jigsaw, in particular a scrolling jigsaw.

According to the invention, a display element is produced, which is provided to display a recommended advancing direction. A "display element" is understood here to mean an element that optically, acoustically, and/or tactilely informs the operator of the path detected by a sensor or of a course of the layout line. The display element here can be composed of LEDs and/or a display and/or another data unit deemed suitable by a person skilled in the art. This makes it advantageously possible for an operator to receive information relating to a desired movement direction, regardless of whether the operator is able to see the saw blade. This makes it possible for an operator to stay within an optimal working region that represents an angular range of the possible saw blade angle.

Other advantages ensue from the following description of the drawings. An exemplary embodiment of the invention will be explained in greater detail in conjunction with the associated drawings. The drawings, the description, and the claims contain numerous defining characteristics in combination. Those skilled in the art will also suitably consider the defining characteristics individually and unite them into other meaningful combinations.

DESCRIPTION OF THE PREFERRED EMBODIMENTS

Figure 1:
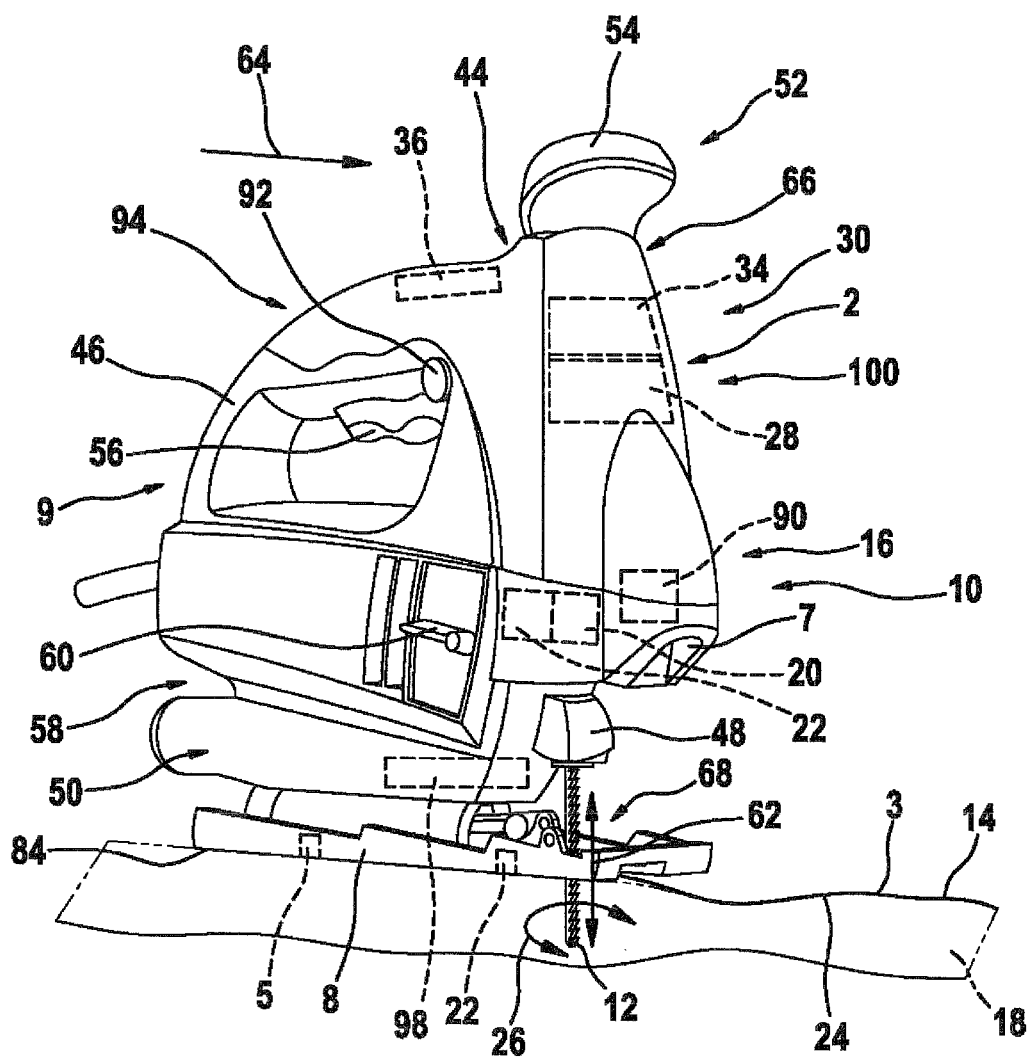
FIG. 1 shows a hand-held jigsaw according to the invention.

FIG. 1 is a perspective side view of a hand-held jigsaw 9 according to the invention, embodied in the form of a scrolling jigsaw. The hand-held jigsaw 9 includes a machine housing 44, a main handle 46 integrated into the machine housing 44, and a tool socket 48 containing a tool in the form of a rotatably supported saw blade 12. A glide element or glide shoe 8 in the form of a base plate is situated on a side 50 oriented toward the work piece 18 to be machined. This glide shoe 8 permits the hand-held jigsaw 9 to advantageously glide on the work piece 18. On the side 52 oriented away from the saw blade 12, in a region that can be associated with the main handle 46, a guide knob is provided, which is used for an at least manual guidance of the hand-held jigsaw 9. The machine housing 44 also contains a motor that is not shown in detail. On the main handle 46, an actuation switch 56 is provided, which can be used to switch the hand-held jigsaw 9 on and off. In a side region 58 of the machine housing 44, an adjusting switch 60 is also provided, which can be used to adjust the glide shoe 8 in relation to a main span 62 of the saw blade 12.

The hand-held jigsaw 9 includes control means 10, 100 that enable an automation of a tracking of the saw blade 12 along the layout line 14. The control means 10 is situated in a part 66 of the machine housing 44 spaced apart from the main handle 46 in the axial direction 64. The control means 10 includes a sensor 16 for detecting or optically scanning a marking or layout line 14 in the form of a normal pencil line 3 provided on the work piece 18. The sensor 16 is composed of a camera unit 7 that preferably includes a low-cost camera and that is associated with a processor unit 28. In principle, the sensor 16 could also be a contrast sensor unit 20 and/or eddy current sensor unit 22 associated with a respective processor unit 28. For an optimal detection of the previously drawn line 14, it would also be conceivable for the eddy current sensor 22 to be situated in the glide shoe 8.

Figure 2:
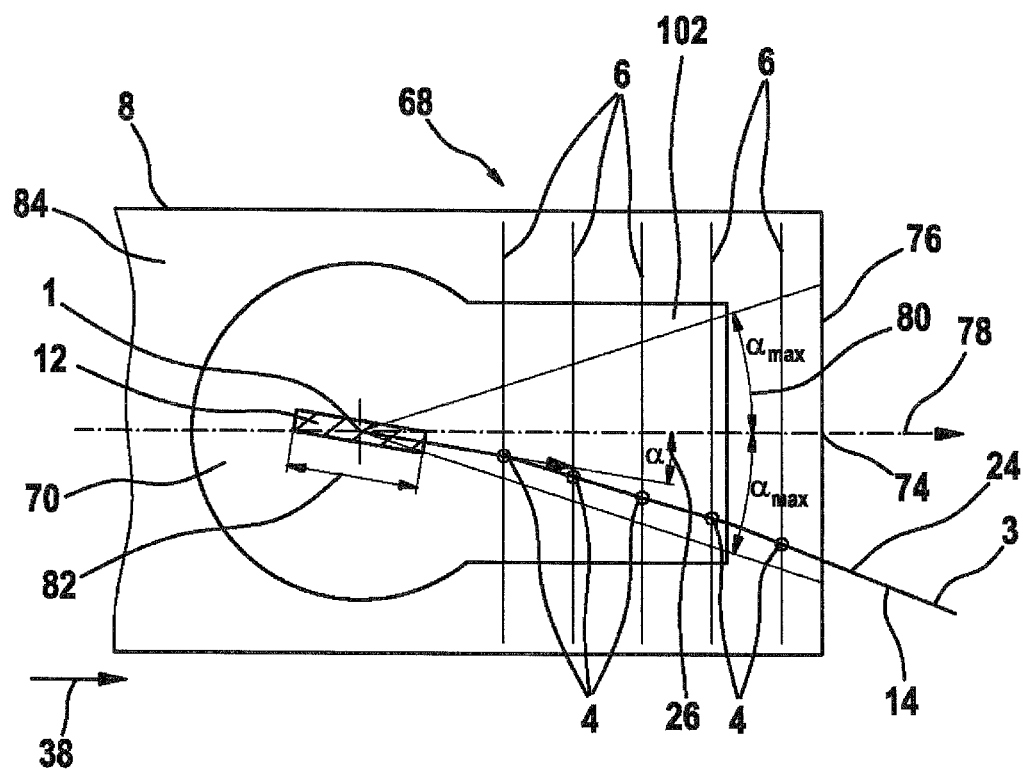
FIG. 2 shows a glide shoe of the hand-held jigsaw according to the invention, embodied in the form of a base plate and equipped with optical sensors.

A monitoring region 68 of the sensor 16 and of the camera unit 7 extends toward the work piece 18 in the same direction as the main span 62 of the saw blade 12 and covers a 360° angular range around the saw blade 12. The monitoring region 68 of the camera unit 7 represents the region in which the saw blade 12 functions in an operating mode, preferably a sawing procedure of a work piece 18. Around the saw blade 12, the glide shoe 8 has a semicircular opening 70 in which the saw blade 12 is centrally situated. In the direction of an advancing direction 38 and in the direction of the monitoring region 68, the opening 70 has a rectangular viewing window 102. The glide shoe 8 also has a reference mark 74 that represents the intersecting point of an edge 76 of the glide shoe 8 with a longitudinal axis 78 of the glide shoe 8 (see FIG. 2).

Figure 3:
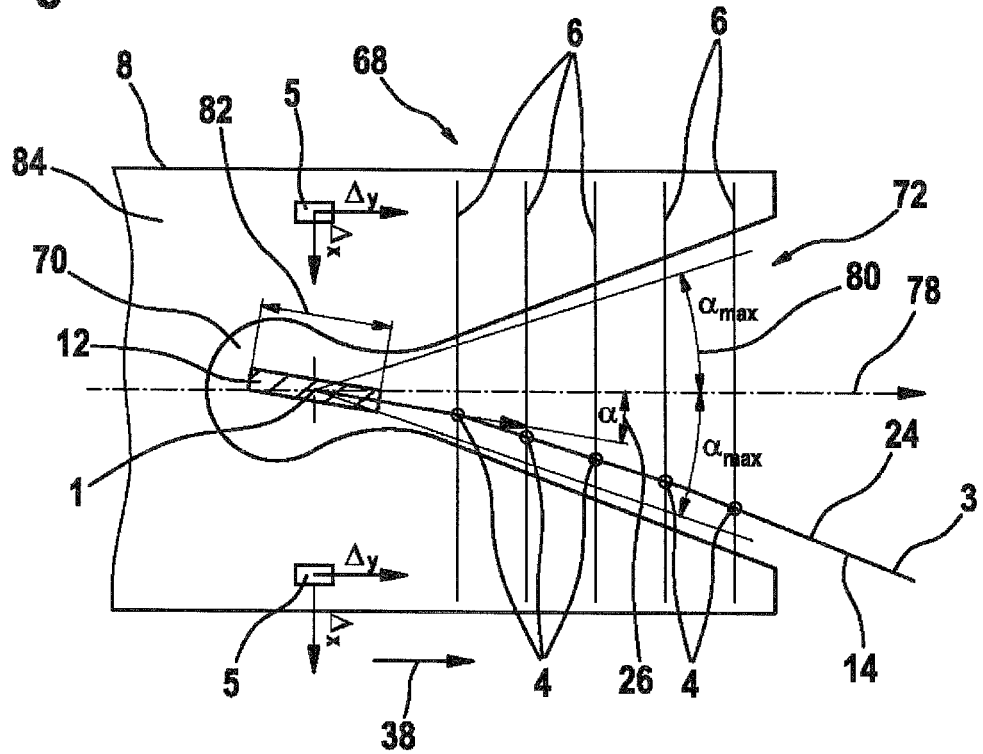
FIG. 3 shows an alternative glide shoe of the hand-held jigsaw according to the invention, embodied in the form of a base plate.

FIG. 3 shows an alternative embodiment of the glide shoe 8. In this case, the central opening 70 widens out in a V-shape to form a viewing region 72.

Figure 4:
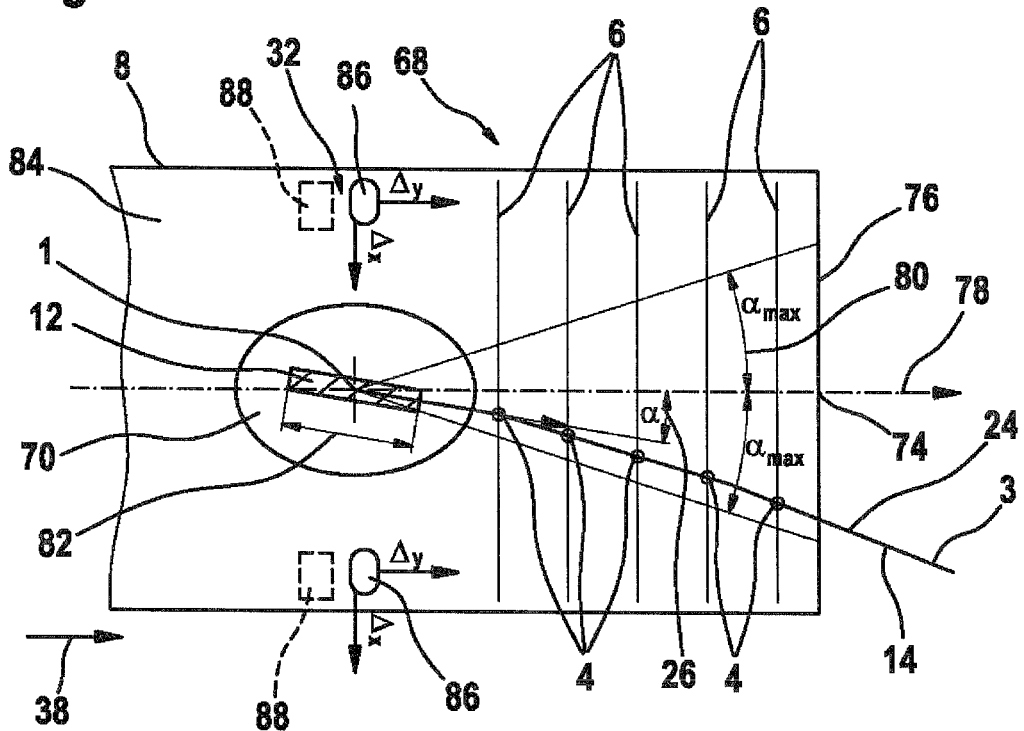
FIG. 4 shows an alternative glide shoe of the hand-held jigsaw according to the invention, embodied in the form of a base plate and equipped with alternative sensors.
Figure 5:
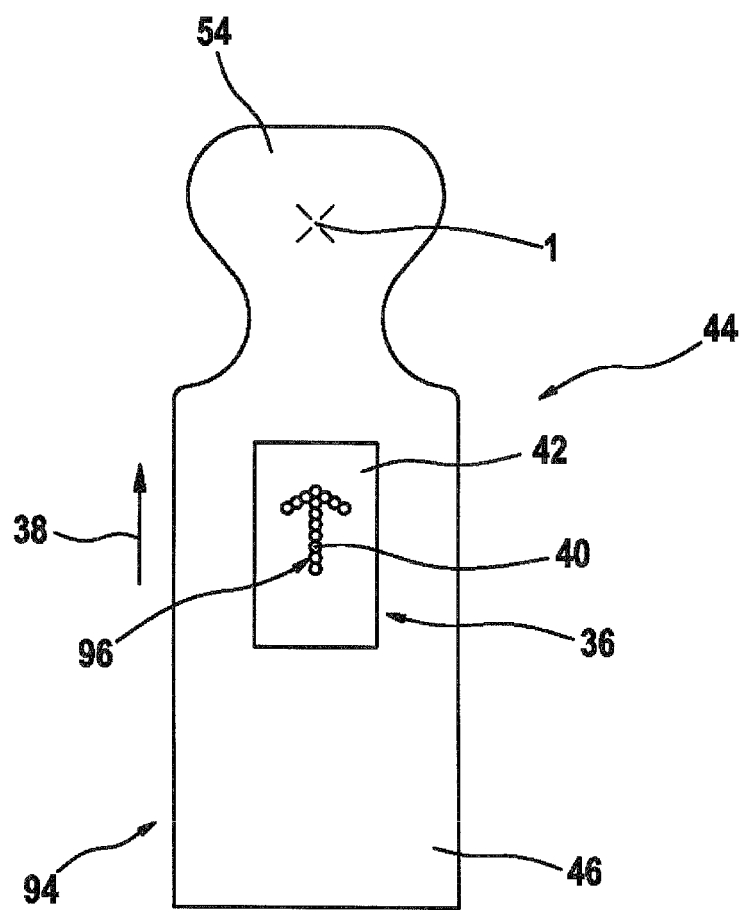
FIG. 5 shows a top view of the hand-held jigsaw.

FIG. 4 shows another alternative embodiment of the glide shoe 8 with a circular opening 70. In this case, the glide shoe 8 is closed in the monitoring region 68 and is embodied as transparent, e.g. is composed of Plexiglas, in order to make it possible to monitor the layout line 14 on the work piece 18 (see FIG. 4).

In addition, the machine housing 44 of the handheld jigsaw 9 contains a compact actuator system 2 that is able to adjust the saw blade 12 around a rotation axis 1 in an automated fashion. The control means 100 is provided for this purpose. For the tracking of the rotatable saw blade 12, the saw blade is driven in rotary fashion by the control means 100. The control means 100 represents an actuator unit 30, embodied in the form of an actuator with a regulator 34 in the form of a step motor by means of which it is possible to adjust a saw blade angle 26 of a saw blade 12. The control means 100 and the step motor can also be situated in a space-saving fashion as an alternative to the guide knob 54. In this case, the saw blade angle 26 is an angle α from the angular range of a pivot angle 80 that is actually set between the width span 82 of the saw blade 12 and the longitudinal axis 78 of the glide shoe 8. The pivot angle 80 represents the angle $\alpha_{max}$ by which the saw blade 12 can be moved around its longitudinal axis, which extends parallel to the main span direction 62 of the saw blade 12, in relation to a longitudinal axis 78 of the glide shoe 8 (see FIG. 2).

With the aid of the control means 10, 100, namely the sensor 16 and the actuator unit 30, it is possible to implement a control loop in order to achieve the most exact possible tracking of the predetermined line or layout line 14. The exceptional feature in this case lies on the one hand in the fact that an analog image processing is used to detect the layout line 14 and on the other hand, lies in the automation of the system. It is consequently possible to execute clean, precise cuts by hand and to actively prevent a deviation of the saw blade 12.

An operating sequence will be described in greater detail below.

The sensor 16 in the form of a camera unit 7 detects individual points 4 of the previously drawn line or layout line 14. In this case, in order to detect the layout line 14, the sensor 16 uses an analog image processing that uses a division of the monitoring region 68 into individual search lines 6 without digital image processing. In the analog image processing, the use of the camera unit 7 is particularly advantageous since it does not require calculation-intensive digital image processing.

The collected sensor information and the data associated with the detected points 4 are then transmitted by the sensor 16 to the processor unit 28, which processes the detected points 4 further and based on them, interpolates and adapts an actual path curve 24 (spline). The processor unit 28 can be a microcontroller or another processing unit deemed suitable by a person skilled in the art.

The processing unit 28 calculates and generates control signals and transmits control signals to the actuator unit 30 for an adjustment of the saw blade angle 26. By means of an actuating element with a regulator 34 in the form of a step motor, the actuator unit 30 then correspondingly adapts the saw blade angle 26, i.e. the angle α around the longitudinal axis parallel to the main span direction 62 of the saw blade 12, as a function of the overlaid user guidance by means of the guide knob 54 of the hand-held jigsaw 9.

At the same time, the use of the sensor 16 and the camera unit 7 also offers the possibility of measuring additional reference marks 74 by means of the glide shoe 8. Furthermore, the sensor 16 can be used for detecting the set saw blade angle 26 and for determining the rotation angle of the saw blade 12. This makes it possible to eliminate additional cost-intensive sensors that unnecessarily take up space.

An additional, alternative embodiment is the integration of a detection of an advancing speed. To this end, optical mouse sensors 5 are situated in the glide shoe 8 on a side 84 oriented toward the work piece 18 and determine the speed and a movement direction, preferably in the x and/or y direction (see FIG. 3).

FIG. 4 shows another possibility for detecting the advancing speed. In this case, a simple running wheel with an angular displacement transducer 32 is provided, e.g. a rolling element 86 with corresponding photoelectric beam detectors 88. In principle, other approaches are also conceivable, for example the comparison of individual camera images by means of the processor unit 28. Within certain limits, the system can also be implemented without a speed measurement.

When the hand-held jigsaw 9 is used, i.e. during a sawing process, an operator guides the hand-held jigsaw 9 manually by means of the main handle 46 and guide knob 54; the operator must roughly predetermine the cutting direction. The system composed of the control means 10, 100, i.e. of the sensor 16 and actuator unit 30, is conceived only for the fine regulation that compensates for irregularities in the saw blade path and/or user guidance.

This system is understood solely as an assisting system, i.e. if no layout line 14 can be detected (end of a line, multiple lines), the system gives a warning by means of an acoustic and/or optical unit 90, stabilizes the current saw blade angle 26, and leaves the control up to the operator, as in conventional jigsaws. No active intervention occurs. If so desired, the system, which can be associated with one or more means and which permits automation of a tracking of the saw blade 12 and/or the hand-held jigsaw 9 along layout lines 14, can be switched off at any time, even preferably manually by the operator. The system advantageously includes the actuator system 2, at least one or speed-detecting sensor such as the optical mouse sensor 5, the control means 10 in the form of the sensor 16 and the camera unit 7, the control means 100 in the form of the actuating unit 30, and the actuator with a regulator 34. For the switching off, a switch 92 is provided in the region of the main handle 46 on the machine housing 40.

As shown in FIG. 4, a display element 36, e.g. in the form of LEDs 40 and/or a display 42, is situated on a side 94 of the machine housing 44 or main handle 46 oriented toward the operator, in the operator's field of view. This display element 36 is provided to display a recommended advancing direction 38, for example symbolized by means of an arrow symbol 96 composed of light-emitting diodes or LEDs 40. The operator is thus shown the direction in which the saw movement must be corrected. Consequently, the display element 36 makes it possible for the operator to stay within an optimum working region that represents an angular range of the possible saw blade angle 26.

In another embodiment of the invention, in order to improve visibility, a blower 98 is provided, which is able to remove or suck away machining residue generated by the sawing process.

On the whole, this makes it possible to significantly simplify the guidance of the hand-held jigsaw 9 while achieving a simultaneously improved sawing result. Another advantage of this system lies in the fact that the often poor visibility of the sawing location now plays only a subordinate role since the fine guidance is performed by the system anyway.

What is claimed is:

1. A hand-held jigsaw, comprising:
   a saw blade;
   control means for automating a tracking of an element selected from the group consisting of a saw blade, the hand-held jigsaw, and both along layout lines;
   a sensor comprising a camera unit configured to use analog image processing to divide a monitoring region into individual search lines and, to detect individual points of layout lines provided on a workpiece;
   optical mouse sensors for detecting movement and speed data;
   an actuator unit;
   a processor unit for receiving and processing sensor information, including movement and speed data, image data and data associated with the detected points and, based on the points, image data, movement and speed data interpolates and adapts an actual path curve or spline, generates control signals and transmits said control signals to the actuator unit for controlling said saw blade speed and movement direction and, by adjustment of a saw blade angle, wherein the saw blade angle represents an angle by which the saw blade is moveable around a longitudinal axis of the saw blade, and wherein said longitudinal axis of said saw blade extends parallel to a main span direction of the saw blade.

2. The hand-held jigsaw as recited in claim 1, wherein the actuator unit adapts the saw blade angle as a function of an overlaid user guidance of a hand-held jigsaw.

3. The hand-held jigsaw as recited in claim 1, wherein the actuator unit is a mechanical/actuator system for adjusting the saw blade angle of the saw blade.

4. The hand-held jigsaw as recited in claim 1, further comprising an actuator with a regulator.

5. The hand-held jigsaw as recited in claim 4, wherein the actuator with the regulator is a unit selected from the group consisting of a servo motor, a step motor and a piezoelectric actuator.

6. The hand-held jigsaw as recited in claim 1, wherein means that permit an automation of the element is switchable.

7. The hand-held jigsaw as recited in claim 1, further comprising a display element provided to display a recommended advancing direction.

8. The hand-held jigsaw as recited in claim 7, wherein the display element is selected from the group consisting of LEDs, a display and both.

9. The hand-held jigsaw at least as recited in claim 1, wherein the saw blade is pivotable and drivable by the control means.

10. The hand-held jigsaw at least as recited in claim 1, wherein the hand-held jigsaw is a scrolling jigsaw.

\* \* \* \* \*